March 24, 1936.    G. C. FARRIS    2,034,900
INTERNAL COMBUSTION ENGINE
Filed Feb. 2, 1934    2 Sheets-Sheet 1
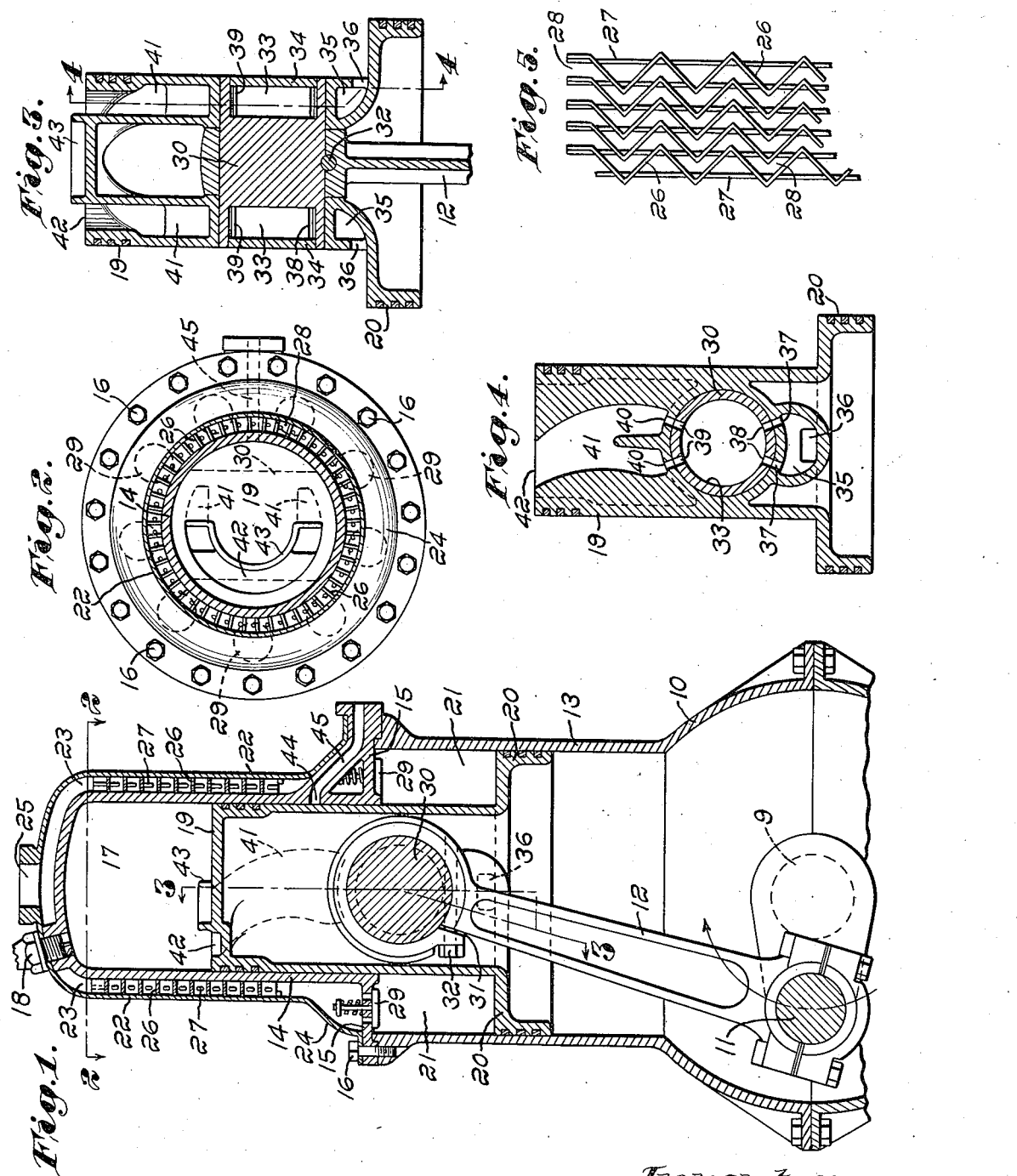
Inventor:
Grover C. Farris March 24, 1936.  G. C. FARRIS  2,034,900
INTERNAL COMBUSTION ENGINE
Filed Feb. 2, 1934  2 Sheets-Sheet 2
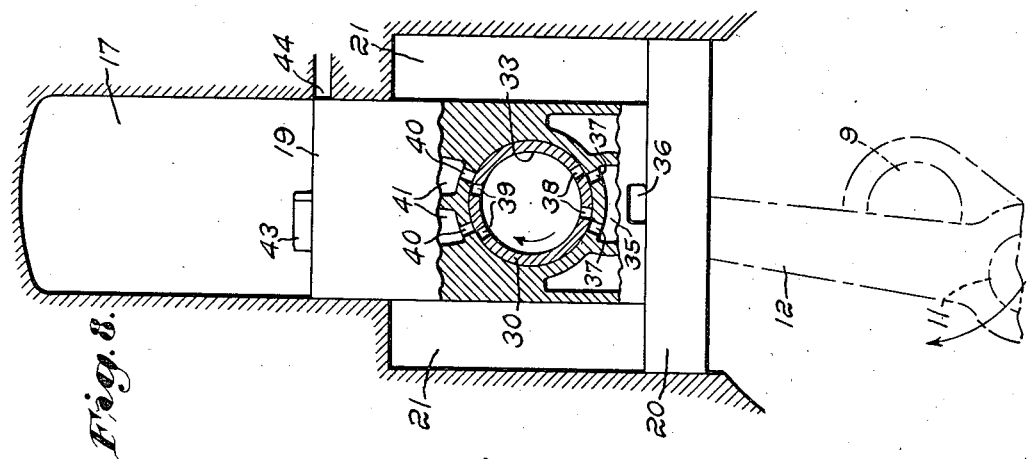
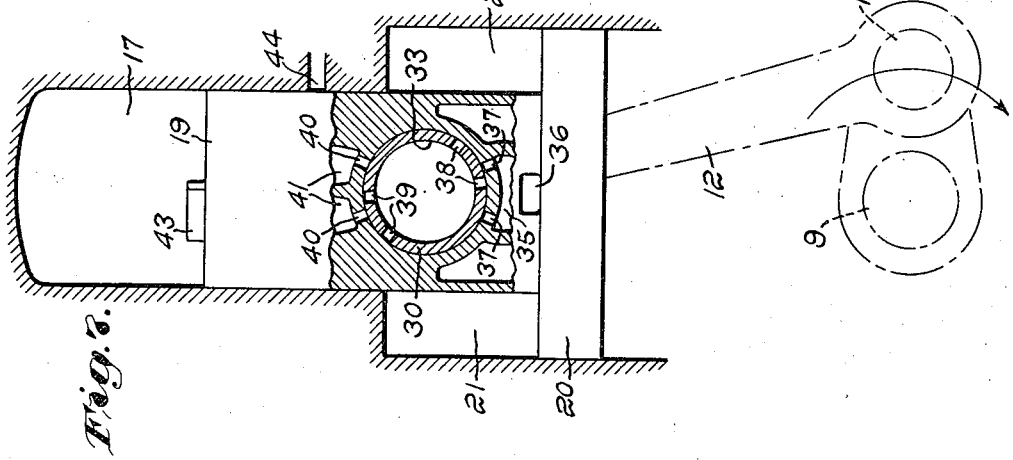
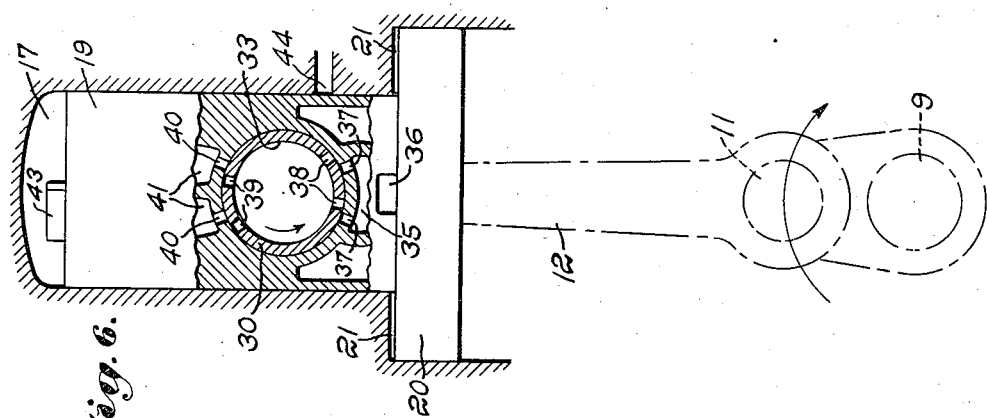
Inventor:
Grover C. Farris Patented Mar. 24, 1936

2,034,900

UNITED STATES PATENT OFFICE 2,034,900

INTERNAL COMBUSTION ENGINE

Grover C. Farris, Chatham, Mass., assignor of one-third to Sabin A. Hutchings, Chatham, Mass.

Application February 2, 1934, Serial No. 709,424

13 Claims. (Cl. 123—71)

My invention aims to increase the efficiency of an internal combustion engine and, for the purpose of illustration, I have shown the improvements as they may be applied to the two-cycle type of engine, but it will be understood that many of these improvements are applicable also to engines of various cycles. Furthermore, it aims to provide an engine embodying simplified construction, fewer working parts, better combustion conditions and elimination of the troublesome water-cooled cylinder.

In engines of the two-cycle type wherein the intake charge has been pre-compressed, great difficulty has been met with back-pressure from the compression chamber, which tends to reverse the flow of an incoming charge and momentarily force it back towards the carburetor. I have overcome this difficulty by a novel and efficient arrangement of valve mechanism.

Another object of the invention is to pre-heat the intake charge and, in so doing, utilize the incoming charge, with certain mechanical devices, to simultaneously act as a cylinder cooling agent. A further object is to make use of the customary wrist-pin as an oscillating valve member, thereby eliminating the necessity of special valve parts and operating mechanism therefor.

Furthermore, I will disclose a novel arrangement of intake ports which provide for a better distribution and a uniflow travel of gases, both in and out of the combustion chamber, and a gas-pocket protection for the wrist-pin valve which serves as a pressure retaining element.

Other objects of the invention will be apparent from the following specification taken in connection with the accompanying drawings in which:

Figure 1 is a vertical central section of a one cylinder engine illustrating my preferred form of construction.

Fig. 2 is a horizontal cross section of one cylinder taken on line 2—2 of Fig. 1.

Fig. 3 is a vertical central section of the piston in detail, taken on line 3—3 of Fig. 1.

Fig. 4 is a vertical detail section of the piston, taken on line 4—4 of Fig. 3, showing one of the duplicate intake passages formed in the piston and its association with ports provided in the wrist-pin valve.

Fig. 5 is an enlarged edge view of a portion of the heat riser employed for cooling the cylinder and heating the intake charge.

Figs. 6, 7 and 8 are semi-diagrammatic illustrations showing the relative positions of the piston, the oscillating valve and associated parts at different periods in the cycle of operation.

In Fig. 1 I have shown a conventional crank shaft 9 suitably mounted in a cranke case 10 and provided with a crank pin 11 adapted to receive a piston rod 12. The crank case 10 may extend upwardly, forming a cylinder as shown at 13, terminating with an open end and arranged to receive and support a working cylinder 14, somewhat smaller in diameter than the cylinder 13. The working cylinder 14 is preferably provided with an annular flange, or base portion, 15 adapted to be bolted as shown at 16, or otherwise secured to cylinder 13, whereby an air-tight connection thereto is obtained. The upper part of cylinder 14 is arranged to provide a combustion chamber 17 which may be provided with the usual spark plug 18 for ignition purposes.

The piston consists of a working portion 19, which reciprocates in cylinder 14, and an enlarged pumping-compressing portion 20 arranged to reciprocate in cylinder 13. This piston arrangement provides a pumping-compression chamber 21, which alternately receives and discharges the combustible mixture as will be presently described.

As one means of conducting a combustible charge to the chamber 21, I may provide a cup shaped casing 22 of substantially the same shape as cylinder 14, but of greater diameter, adapted to cover said cylinder and leave an annular air space 23 therebetween. The lower portion of the casing 22 may be flared, or bell shaped as at 24, and secured to flange 15 by the bolts 16 in an air-tight manner. The upper portion of casing 22 may be provided with an apertured flange member 25 adapted to receive a carburetor, or to communicate with a similar device.

In the air space 23, intermediate cylinder 14 and casing 22, I prefer to employ a combined charge-mixing and heat-transmitting element such as that illustrated in detail by Fig. 5 of the drawings.

This element comprises a series of flat, thin members 26, of substantially the same width as space 23, and preferably of corrugated formation, as shown, in order to greatly increase the area thereof. The members 26 may be assembled in spaced relationship to each other by perforating the tip of each corrugation and inserting a rod 27 therein extending throughout the length of said member, each rod interlocking its associated member with the adjacent one. The rods may be secured to their respective members by welding at points of contact therewith. It will be clear that the assembled unit may be circular in form and easily placed within casing 22, whereby said assembly may be easily applied to, or removed from, cylinder 14.

While the corrugated members 26 serve as heat radiating means from cylinder 14 to casing 22 they also serve as a mixture warming and agitating device, because when a combustible mixture is drawn in through aperture 25, by action of portion 20 of the piston, it is compelled to pass downwardly through the spaces 28 formed between members 26.

The annular cylinder flange 15, which separates chamber 21 from space 23, may be provided with a series of self-closing one way valves 29, which will permit a charge to be drawn into chamber 21 but will prevent the same from returning to space 23 during upward travel of the piston. It will be clear from the foregoing that the intake charge is drawn into chamber 21 by downward travel of the piston and trapped therein to be compressed later by upward travel of the piston.

I will now describe the valve mechanism which controls admission of the intake charge from compression chamber 21 to the combustion chamber 17, above referred to. Referring more particularly to Figs. 3 and 4 of the drawings, I have shown the upper end of piston rod 12 connected to a wrist-pin 30 suitably mounted in piston 19 and being of special design arranged to be utilized as an oscillating valve member, thereby serving a double purpose. This end of the piston rod 12 may be slotted as indicated at 31 and a clamping bolt 32 arranged to intersect the wrist-pin to prevent rotation thereof relative to the rod 12, whereby the wrist-pin is caused to oscillate due to the angular motion of said rod, when in operation, relative to the piston. I prefer to construct the wrist-pin valve member with a solid central portion and counterbore each end thereof to form passageways 33 for the intake charge. I may employ header members 34 to close the outer ends of the counterbored chambers to prevent leakage.

The lower portion of working piston 19 is provided with a pair of charge receiving chambers 35 which are positioned diametrically of the piston and preferably in a vertical plane with the wrist-pin axis. These chambers 35 are in communication at all times with compression chamber 21 by means of ports 36 formed in the wall of the piston. The upper portions of these chambers are provided with ports 37 (see Fig. 4), which are caused to register, at the proper time, with ports 38 in communication with the oscillating valve passageways 33. Diametrically opposite ports 38 are similar ports 39 which are simultaneously caused to register with ports 40, in the piston hub, said ports 40 being in communication at all times with other charge passageways 41 leading directly to the combustion chamber 17.

In the ordinary engine of this type, the fuel charge separates after it enters the combustion chamber, which permits the outer layer of this charge to cling to the cylinder walls, thereby cooling and becoming stagnant, or slow to ignite, while the other part is burned. These stagnant gases burn so late that this energy and heat is wasted, causing high power losses and other difficulties. I have been able to overcome these losses by a novel arrangement and construction of the passageways 41. Referring to Figs. 2 and 4, it will be seen that these passageways extend upwardly from the oscillating valve and to the left of the piston axis before emerging from the piston face. The passages also follow the general contour of the piston walls and meet at a point near the piston face which lies on the piston diameter transverse to the axial line of valve 30. As clearly shown in Fig. 2, this construction provides an inlet port 42 which is common to the passageways 41 and semicircular in formation. I preferably provide an upstanding rib portion 43, which may be integral with the piston, to further aid in obtaining desirable distribution of the incoming charge.

An exhaust port 44 is adapted to be uncovered by piston 19 near the end of its power stroke, for the purpose of releasing the burned gases from combustion chamber 17. This port operates in the usual well known manner, but its position, relative to intake port 42 should be as shown, namely, at the opposite side of the combustion chamber. I have shown an exhaust passageway 45 extending outwardly and downwardly to emerge from beneath the casing 22, thereby avoiding any chance for leakage and at the same time providing for economical construction and easily assembled parts. It will be clear that removal of bolts 16 will permit removal of casing 22 and also subsequent removal of cylinder 14, or they may be removed as a single unit from cylinder 13.

*Operation.*—The cycle of operation will be clearly understood by referring to Figs. 1, 4, 6, 7 and 8. Referring first to Fig. 1, it will be noted that the piston is shown as being on its upward, or intake-compression stroke. It must, of course, be assumed that the combustion chamber is empty and that compression chamber 21 has already received an incoming charge of gas, on the previous downward stroke of piston 20, which has been partially compressed by some upward travel thereof. Valves 29 being closed, there is no way for the gas to escape from chamber 21 until ports 38, in the oscillating valve, have been brought to register with ports 37 in the piston; this took place shortly after crank-pin 11 passed bottom center, as will be seen from Fig. 8. Simultaneously, ports 39 were brought into register with ports 40 in the piston, due to travel of piston rod 12 to the left. There may now be an obstructed movement of gas from chamber 21 to combustion chamber 17, by means of ports 36, chambers 35, passageways 33 and 41 to port 42. It will be clear that the intake charge from chamber 21 will thus be compressed by upward travel of the piston and continue to be forced into the combustion chamber during substantially the entire upward movement thereof, or, until ports 38 and 39 are closed.

This intake charge entering the combustion chamber under pressure and in two separate streams, which are travelling in a circular path and collide as they emerge from port 42, automatically brings about a very desirable distribution thereof within the chamber prior to ignition and results in the advantages set forth above.

As the piston continues its upward movement, (Fig. 1,) the rod 12 will soon begin to move to the right and begin to close ports 38 and 39, the entire closing thereof being effected slightly before top center position of crank-pin 11 as clearly shown in Fig. 6. An important feature of my invention should be mentioned at this point. It will be seen that a compressed charge has been trapped within passageways 33 but must remain there until after the piston has completed its next pumping stroke. A small portion of the charge still remains under pressure in chambers 35 and chamber 21. The valves 29, however, will not open until a slight vacuum has been created in chamber 21, therefore, there can be no back pressure present to retard inward progress of the fresh charge from chamber 23. Furthermore, the pumping chamber 21 will be filled with fresh gas and valves 29 will be closed before the trapped charge in passageways 33 is released, as will be clearly seen by reference to Fig. 8.

Fig. 7 illustrates the power stroke of the piston and it will be seen that ports 38 and 39 are still closed while rod 12 has reached its limit of travel to the right and is about to travel to the left again and in so doing will eventually bring ports 38 and 39 to again register with ports 37 and 40, respectively, as shown in Fig. 8, which represents the beginning of the intake stroke. It will be clear that every power stroke is also a pumping stroke, with respect to piston 20, and that each upward stroke thereof is a charge-compressing stroke.

One of the purposes for positioning the valve member 30 in the lower portion of piston 19 is to obtain the elongated passageways 41 which will trap a quantity of gas therein on each power stroke and serve as a means of protection for the valve, because of the fact that the gas will not burn to the bottom of these passageways; therefore, the valve will not be swept by flame and require any special means of lubrication.

While I have shown the invention embodied in a single cylinder engine, it is obvious that any number of cylinders may be used, also that any other means of ignition may be substituted for electricity without departing from the scope of the invention.

I claim:

1. In a two-cycle engine having a cylinder presenting a working chamber of one diameter and a cylinder presenting a fuel pumping-compressing chamber of a greater diameter, the combination of a fuel intake passageway substantially surrounding the working cylinder and forming a cooling arrangement therefor, means positioned in the intake passageway arranged to interrupt the direct flowing of fuel therethrough and pre-heat the charge, a header member between the intake passageway and said pumping-compressing chamber, a valve in the header member to control the flow of fuel from the intake passageway to the pumping-compressing chamber, a piston arranged to reciprocate in the working chamber, a wrist-pin carried by the piston, a piston rod secured to the wrist-pin and connected to the engine crank-shaft, a pair of fuel passageways in the interior of the piston positioned at either side of the piston rod and affording communication between said pumping-compression chamber and the wrist-pin periphery at all times, and a second pair of fuel passageways in the interior of the piston arranged to extend longitudinally thereof, said passageways being substantially in line with the last mentioned passageways and cooperating with ports in the wrist-pin to direct the course of fuel from the pumping-compressing chamber to the working chamber in timed relationship with said crank-shaft.

2. In a two-cycle engine having a cylinder presenting a working chamber of one diameter and a cylinder presenting a fuel pumping-compressing chamber of a greater diameter, the combination of a fuel intake passageway substantially surrounding the working cylinder and forming a cooling arrangement therefor, a header member arranged to seal the intake end of the pumping-compressing chamber, a plurality of one-way valve elements associated with the header member and arranged to control the outlet from said intake passageway, a piston, an oscillating valve located in the interior of the piston, a pair of fuel passageways in the piston leading from the pumping-compression chamber to the oscillating valve, a semi-circular port in the outer end of said piston opening into the working chamber, and another pair of fuel passageways in the piston leading from the oscillating valve to the semi-circular port.

3. In a two-cycle engine having a cylinder presenting a working chamber of one diameter and a cylinder presenting a fuel pumping chamber of a greater diameter, a piston having a working end and a pumping end adapted respectively to said chambers, a fuel passageway adapted for communication with a source of supply, an apertured header member arranged to seal the intake end of said pumping chamber, valve mechanism associated with the header member and the apertures therein to control the admission of fuel from said passageway to the pumping chamber, another fuel control valve located in the interior of said working piston, and passageways within the working piston cooperating with the last mentioned valve to admit pre-compressed fuel to the working chamber.

4. In a two-cycle engine having a cylinder presenting a working chamber of one diameter and a cylinder presenting a fuel pumping chamber of a greater diameter, a piston having a working end and a pumping end adapted respectively to said chambers, a fuel passageway adapted for communication with a source of supply, an apertured header member arranged to seal the intake end of said pumping chamber, and a plurality of vacuum operated valves associated with the header member to control the admission of fuel from said passageway to the pumping chamber, said valves being arranged to normally close the apertures in said header.

5. In a two-cycle engine having a cylinder presenting a working chamber of one diameter and a cylinder presenting a fuel pumping chamber of a greater diameter, a piston having a working end and a pumping end adapted respectively to said chambers, a fuel passageway adapted for communication with a source of supply, an apertured header member arranged to seal the intake end of said pumping chamber, and valve mechanism carried by the header member arranged to control the direction of fuel travel between said passageway and the pumping chamber.

6. In a two-cycle engine, the combination of a cylinder member free from intake ports, a working piston arranged to reciprocate in said cylinder and cooperate therewith to form a combustion chamber, an oscillating fuel-control valve carried by said piston, said valve being positioned remote from the combustion chamber end of the piston, and a fuel passageway leading from said control valve directly into the combustion chamber and arranged to form a fuel pocket for unburned gases, whereby said control valve will be shielded from flame at all times.

7. In a two-cycle engine having a working cylinder free from intake ports, a working piston arranged to reciprocate in said cylinder, an exhaust port located in the lower portion of the cylinder and arranged to be uncovered by said piston when near the end of its inward stroke, a combustion chamber and a fuel pre-compressing chamber, an oscillating fuel-timing valve carried by the piston and arranged to function as a wrist pin, said valve being in communication at all times with said compressing chamber, and a fuel intake passageway in the interior of said piston arranged to be in communication at all times with the fuel-timing valve and the combustion chamber.

8. In a two-cycle engine, the combination of a cylinder having a working chamber, a working piston arranged to reciprocate in said chamber, another chamber substantially surrounding said cylinder adapted to define the path of incoming fuel, a port at one end of the last mentioned chamber arranged for communication with a carburetor, a valve-controlled outlet port at the opposite end of said chamber, and an oscillating fuel-control valve carried by the working piston arranged to admit the fuel to said working chamber.

9. In an internal combustion engine, the combination of a cylinder having a working chamber, a piston arranged to reciprocate in said chamber, a cylinder jacket arranged to substantially surround the wall of the working chamber in spaced relationship thereto, said space being adapted to form a fuel passageway having an inlet port and an outlet port, a fuel pre-heating element arranged within the fuel passageway intermediate said inlet and outlet ports, and a cylindrical fuel-control valve carried by said piston arranged so that the valve periphery will serve to sustain pressure within the working chamber during the engine power stroke.

10. In a two-cycle engine, the combination of a cylinder having a working chamber free from intake ports, a working piston arranged to reciprocate in said chamber, an oscillating wrist pin, a pair of diametrically opposed fuel passageways formed in the interior of said piston and extending vertically from said wrist pin to the working chamber, means to pre-compress the fuel charge, another pair of vertically positioned fuel passageways arranged to guide compressed fuel to said wrist pin, and ports in the wrist pin arranged to provide communication between the diametrically opposed passageways and the last named passageways, all of said passageways and said ports being arranged to provide a substantially straight line of travel for the fuel charge, in one continuous direction within the piston.

11. In a two-cycle engine, the combination of a working chamber, a fuel compressing chamber, a single working piston associated with the working chamber, a wrist pin utilized as a fuel-control valve adapted to hold compression and having ports therein to admit a pre-compressed charge of fuel from the compressing chamber directly into the working chamber during a predetermined portion of engine operating cycle, and means to utilize unburned fuel as a flame shield for the fuel-control valve.

12. In a two-cycle engine, in combination, a cylinder having a working chamber, a single working piston arranged to reciprocate in said chamber, an exhaust port in the cylinder wall arranged to be controlled by the piston periphery, means to pre-compress the fuel charge, intake fuel passageways located at the interior of said piston, an oscillating wrist pin carried by the piston being associated with said passageways and arranged so that the periphery of said pin serves as pressure sustaining means during a predetermined portion of the operating cycle, said wrist pin being operable in timed relationship with the working piston.

13. In an internal combustion engine, in combination, a cylinder having a working chamber free from intake ports, a single working piston arranged to reciprocate in said chamber, a wrist-pin carried by said piston, a fuel-retaining chamber formed within the wrist-pin, a piston-rod fixedly connected to said wrist-pin whereby oscillatory motion will be imparted thereto, and ports located in the periphery of the wrist-pin arranged to provide communication between said fuel retaining chamber and intake-fuel passageways during a predetermined portion of wrist-pin oscillation and piston reciprocation.

GROVER C. FARRIS.